Figure 1:
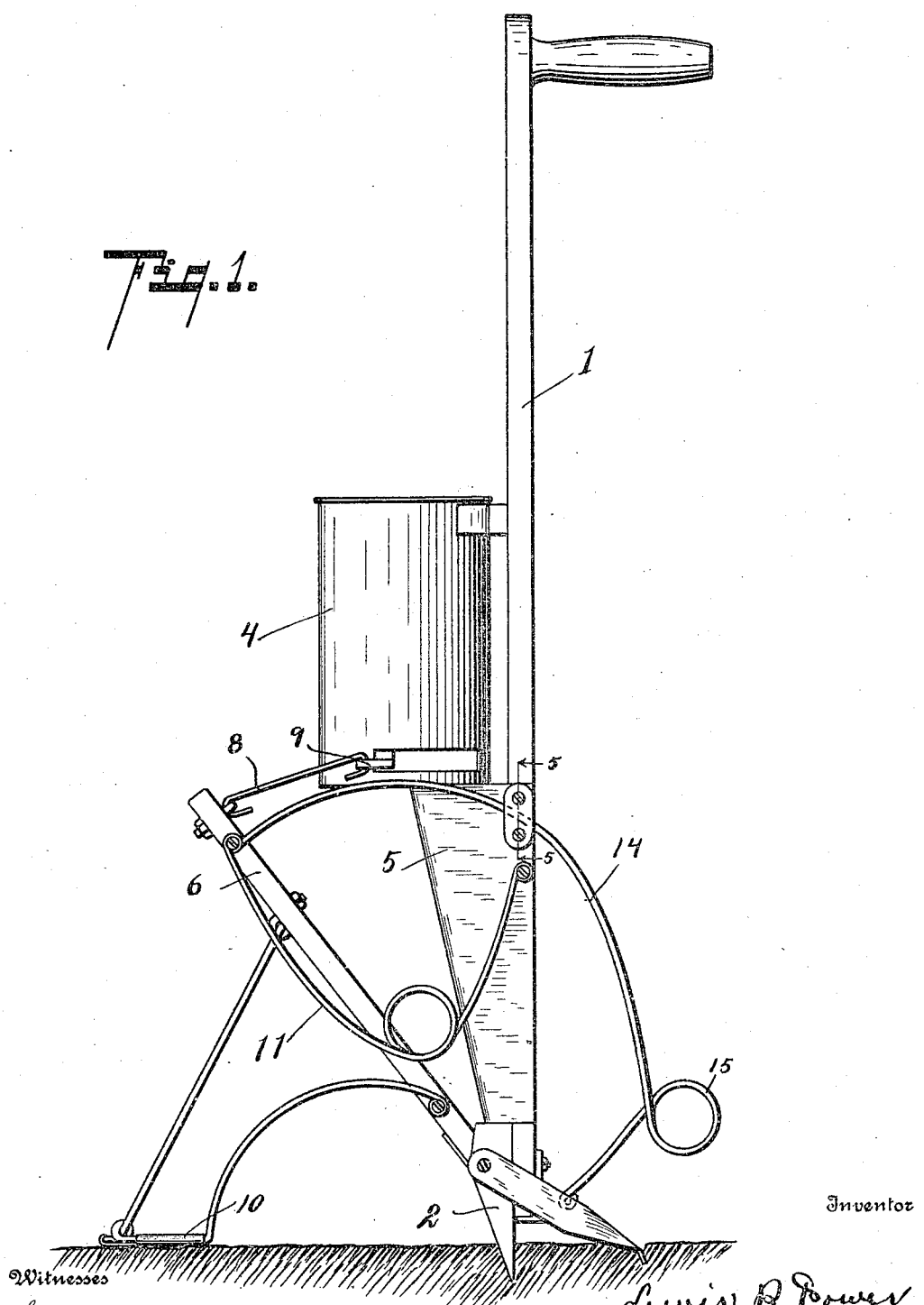

L. R. POWER.
HAND PLANTER.
APPLICATION FILED JULY 6, 1909.

950,303.

Patented Feb. 22, 1910.
2 SHEETS—SHEET 1.

Witnesses
Gertrude Tallman
Margaret Glasgow

Inventor
Lewis R. Power
By Chappell Earl
Attorneys

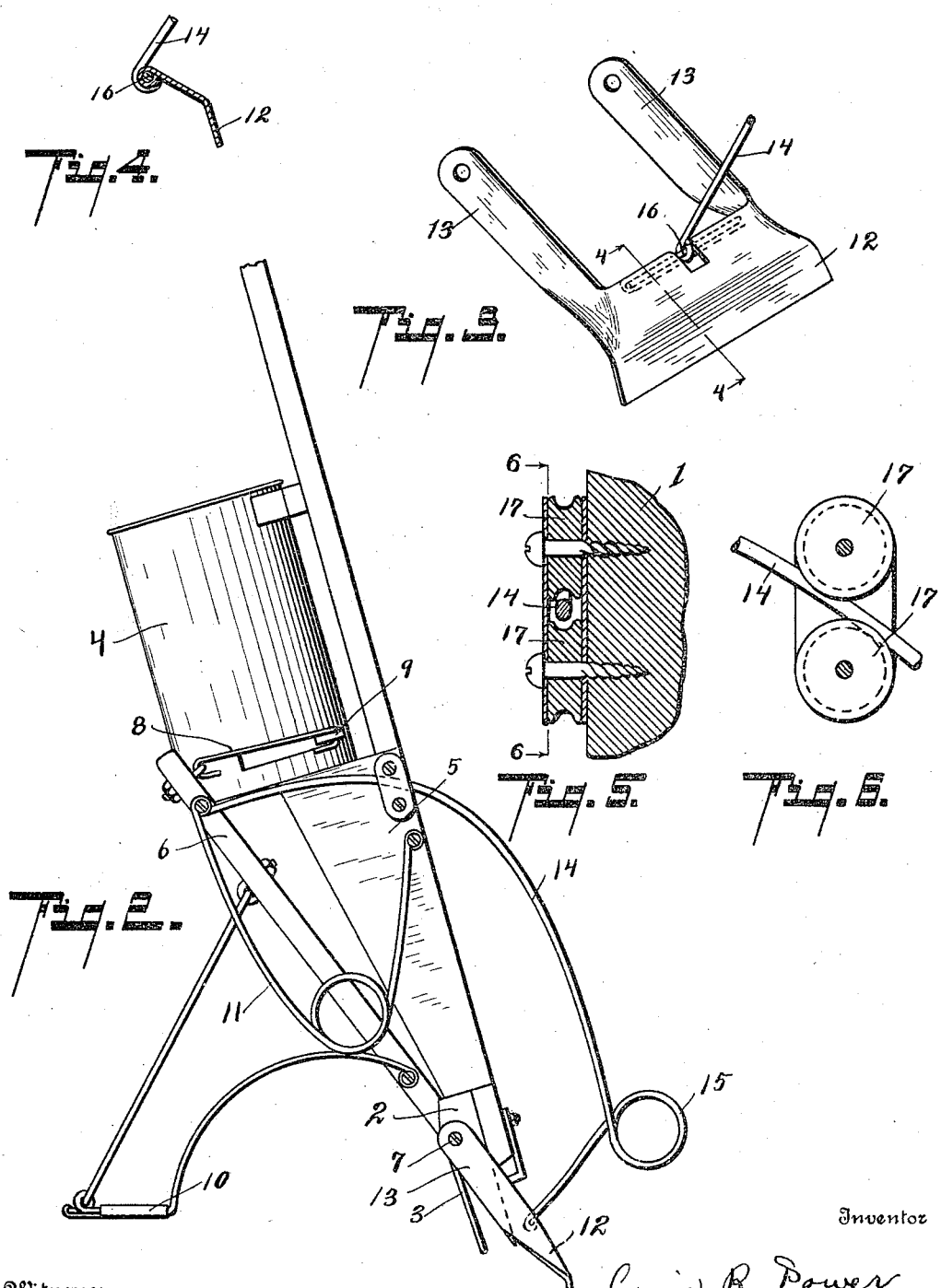

UNITED STATES PATENT OFFICE.

LEWIS R. POWER, OF PAW PAW, MICHIGAN.

HAND-PLANTER.

950,303.  Specification of Letters Patent.  Patented Feb. 22, 1910.

Application filed July 6, 1909. Serial No. 506,079.

*To all whom it may concern:*

Be it known that I, LEWIS R. POWER, a citizen of the United States, residing in the city of Paw Paw, county of Van Buren, State of Michigan, have invented certain new and useful Improvements in Hand-Planters, of which the following is a specification.

This invention relates to improvements in hand planters.

The main object of this invention is to provide an improved hand planter which will effectively cover the grain deposited.

A further object is to provide a hand planter to accomplish this result which is light in weight and easy in operation.

Further objects, and objects relating to structural details, will definitely appear from the detailed description to follow.

I accomplish the objects of my invention by the devices and means described in the following specification.

The structure described constitutes one effective embodiment of my invention. Other embodiments would be readily devised by those skilled in the art.

The invention is clearly defined and pointed out in the claims.

A structure constituting an effective and preferred embodiment of the features of my invention is clearly illustrated in the accompanying drawing, forming a part of this invention, in which:

Figure 1 is a side elevation of a structure embodying the features of my invention, the blade being shown inserted in the ground. Fig. 2 is a detail side elevation thereof, showing the blade withdrawn from the ground. Fig. 3 is a detail perspective of the covering member removed from the planter. Fig. 4 is a detail section of the covering member taken on a line corresponding to line 4—4 of Fig. 3. Fig. 5 is an enlarged detail section of the guide for the connecting or actuating rod of the covering member, taken on a line corresponding to line 5—5 of Fig. 2. Fig. 6 is a detail section, taken on a line corresponding to line 6—6 of Fig. 5.

In the drawings, similar reference characters refer to similar parts throughout the several views, and the sectional views are taken looking in the direction of the little arrows at the ends of the section lines.

Referring to the drawing, 1 is the standard or staff of the planter, at the lower end of which is a delivery blade 2, which is preferably provided with a movable member 3. The hopper 4 is mounted on the standard, and is connected to the delivery blade by means of a spout 5. A suitable dropping mechanism is provided, the details of which are not here illustrated.

The movable member of the blade is preferably mounted on the lever 6, which is pivoted at 7, the upper end of the lever being connected by the link 8 to the actuating arm 9 of the dropping mechanism. The lever 6 is provided with an actuating foot 10, which engages the ground and throws the lever 6 inwardly to operate the dropping mechanism and open the movable delivery member 3 of the blade. This takes place as the standard is rocked forwardly. The lever 6 is returned by means of a spring 11. These parts above described are all of the well-known form.

The covering member 12 is preferably provided with a pair of arms 13, which are mounted on the pivot 7 of the lever 6, so that the covering member is carried to the rear of the delivery blade. The covering member is connected by the connecting rod 14 to the lever 6. This connecting rod is preferably curved, and provided with a spring coil 15 adjacent to the covering member. The rod is preferably connected to the covering member by means of the pin 16, as illustrated in Fig. 3.

I preferably provide a guide for the connecting rod, consisting of a pair of grooved rollers 17, which are mounted on the side of the standard. These curved rollers permit the free movement of the connecting rod, and at the same time, hold it firmly in place.

In operation of the device, as the blade is inserted in the ground to deliver the grain, the covering member assumes the position shown in Fig. 1, and as it is lifted from the ground, the standard being rocked forwardly, the lever 6 is actuated through its foot so that the covering member is swung toward the covering blade, thus forcing the earth over the grain. This covering attachment is very light in weight and does not add materially to the effort required to operate the planter.

I have illustrated my improvements in an embodiment which I have found practical in use and as applied to a planter now quite extensively used. I am aware, however, that my improvements are applicable to other forms of planters, and that the structural details thereof may be very considerably varied without departing from my invention, and I desire to be understood as claiming the same specifically, as illustrated, as well as broadly.

Having thus described my invention, what I claim as new and desire to secure by Letters Patent, is:

1. In a planter, the combination with a standard, of a delivery blade comprising a movable delivery member; a dropping mechanism; an actuating lever for said dropping mechanism and said movable member of said blades; an actuating foot for said lever; a pivoted covering member; a curved connecting rod for said covering member to said lever; a guide for said coupling rod, comprising a pair of rollers between which said rod is arranged to reciprocate; and a return spring for said lever.

2. In a planter, the combination with a standard, of a delivery blade comprising a movable delivery member; a dropping mechanism; an actuating lever for said dropping mechanism and said movable member of said blade; an actuating foot for said lever; a pivoted covering member; a spring connecting rod for said covering member to said lever; and a return spring for said lever.

3. In a planter, the combination with a standard, of a delivery blade comprising a movable delivery member; a dropping mechanism; an actuating lever for said dropping mechanism and said movable member of said blade; an actuating foot for said lever; a pivoted covering member; a connecting rod for said covering member to said lever; and a return spring for said lever.

4. In a planter, the combination with a standard, of a delivery blade comprising a movable delivery member; means for actuating said movable member of said blade; a covering member; and a spring connecting rod for said covering member to said delivery blade actuating means.

5. In a planter, the combination with a standard; of a delivery blade comprising a movable delivery member; means for actuating said movable member of said blade; a covering member; and a connecting rod for said covering member to said delivery blade actuating means.

6. In a planter, the combination with a standard, of a delivery blade; a dropping mechanism; means for actuating said dropping mechanism; a covering member; and a spring connecting rod for said covering member to said means for actuating said dropping mechanism.

7. In a planter, the combination with a standard, of a delivery blade; a dropping mechanism; means for actuating said dropping mechanism; a covering member; and a connecting rod for said covering member to said means for actuating said dropping mechanism.

8. In a planter, the combination with a standard, of a delivery blade; a pivoted covering member; a pivoted actuating foot therefor; a connection for said covering member to said actuating foot comprising a connecting rod, said rod being curved and having a spring coil therein; a guide for said coupling rod, comprising a pair of rollers between which said rod is arranged to reciprocate; and a return spring for said actuating foot.

9. In a planter, the combination with a standard; of a delivery blade; a pivoted covering member; a pivoted actuating foot therefor; a connection for said covering member to said actuating foot comprising a connecting rod, said rod being curved; a guide for said coupling rod, comprising a pair of rollers between which said rod is arranged to reciprocate; and a return spring for said actuating foot.

10. In a planter, the combination with a standard, of a delivery blade; a pivoted covering member; a pivoted actuating foot therefor; a connection for said covering member to said actuating foot comprising a connecting rod, and having a spring coil therein; and a return spring for said actuating foot.

11. In a planter, the combination with a standard, of a delivery blade; a pivoted covering member; a pivoted actuating foot therefor; a connection for said covering member to said actuating foot comprising a connecting rod, said rod being curved; and a return spring for said actuating foot.

12. In a planter, the combination with a standard, of a delivery blade; a pivoted covering member arranged to project to the rear of said blade and arranged to engage the ground, as the blade is inserted therein; and means for actuating said covering member whereby it is swung downwardly and forwardly toward said blade as the blade is withdrawn from the ground, said actuating means comprising a spring connection to the blade.

13. In a planter, the combination with a standard, of a delivery blade; a pivoted covering member arranged to project to the rear of said blade and arranged to engage the ground, as the blade is inserted therein; and means for actuating said covering member whereby it is swung downwardly and forwardly toward said blade as the blade is withdrawn from the ground.

14. In a planter, the combination with a standard, of a delivery blade; a covering member arranged to engage the ground, as the blade is inserted therein; and means for actuating said covering member whereby it is moved toward said blade as the blade is withdrawn from the ground, said actuating means comprising a spring connection to the blade.

15. In a planter, the combination with a standard, of a delivery blade; a covering member arranged to engage the ground, as the blade is inserted therein; and means for actuating said covering member whereby it is moved toward said blade as the blade is withdrawn from the ground.

In witness whereof, I have hereunto set my hand and seal in the presence of two witnesses.

LEWIS R. POWER. [L. S.]

Witnesses:
 CHAS. W. BAKER,
 WM. KILLEFER.